June 15, 1937. H. D. WELLS 2,083,884
WASTEPAPER DE-INKING AND DE-FIBERING PROCESS AND APPARATUS
Filed Sept. 24, 1932 5 Sheets-Sheet 1
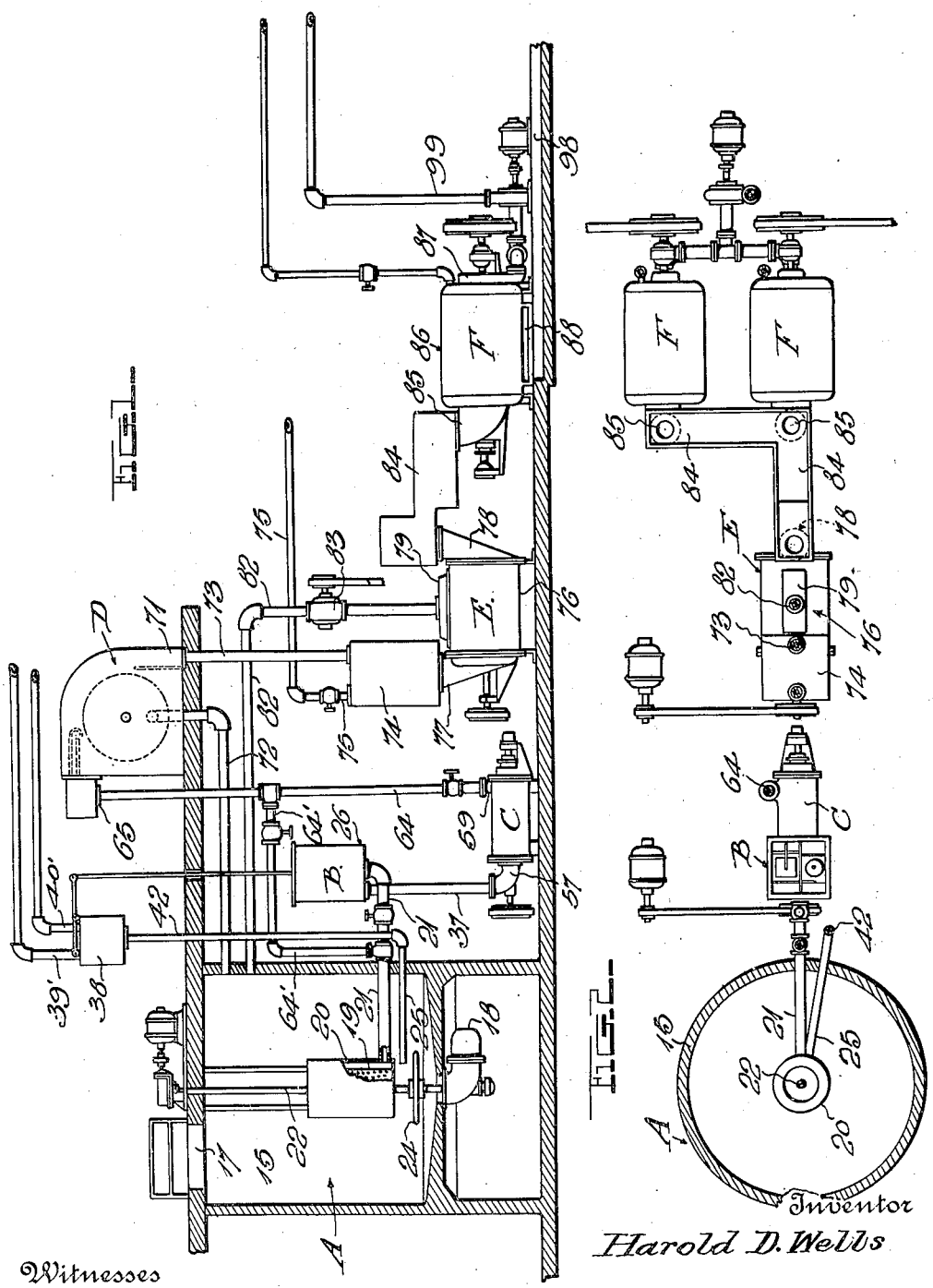
Inventor
Harold D. Wells
Witnesses
H. Woodard
By H. B. Wilson & Co.
Attorneys.

June 15, 1937.  H. D. WELLS  2,083,884
WASTEPAPER DE-INKING AND DE-FIBERING PROCESS AND APPARATUS
Filed Sept. 24, 1932  5 Sheets-Sheet 2
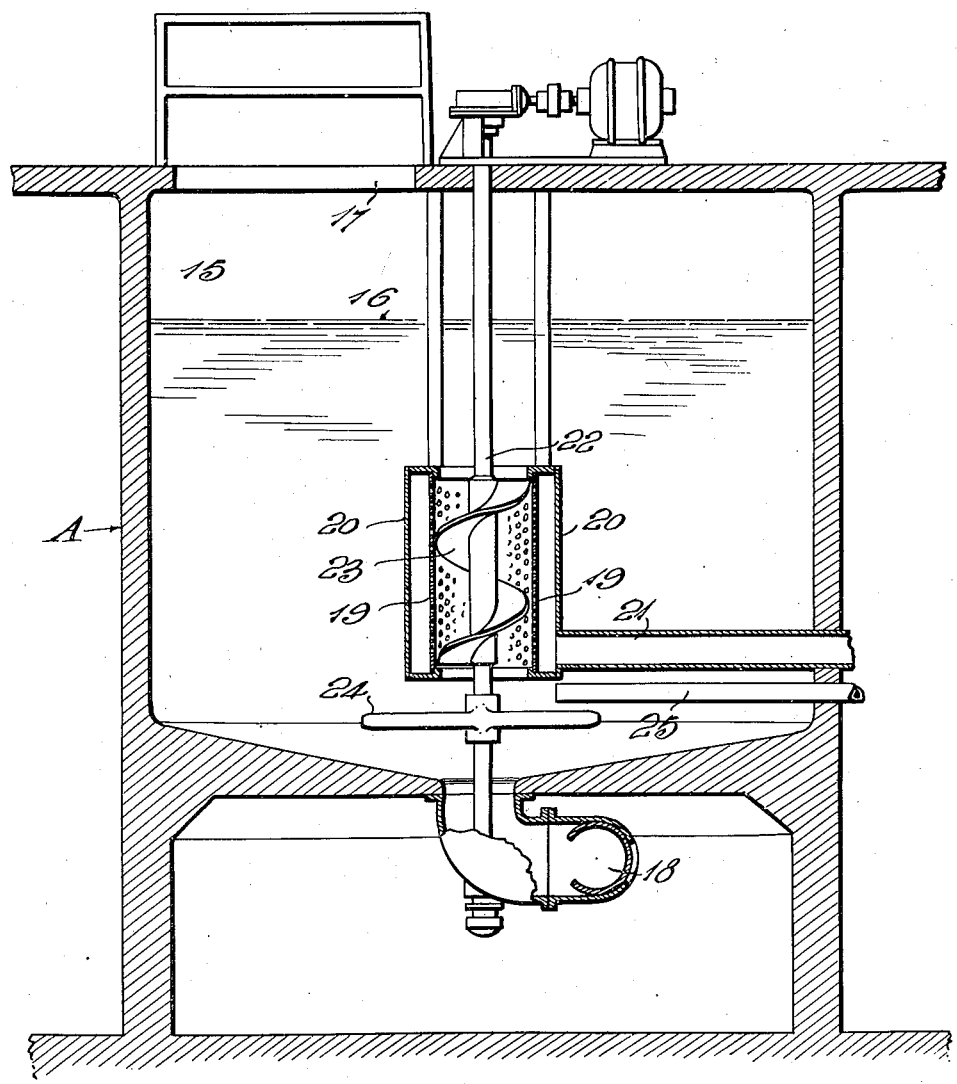
Inventor
Harold D. Wells
Witnesses
H. Woodard
By H. R. Williamson & Co.
Attorneys

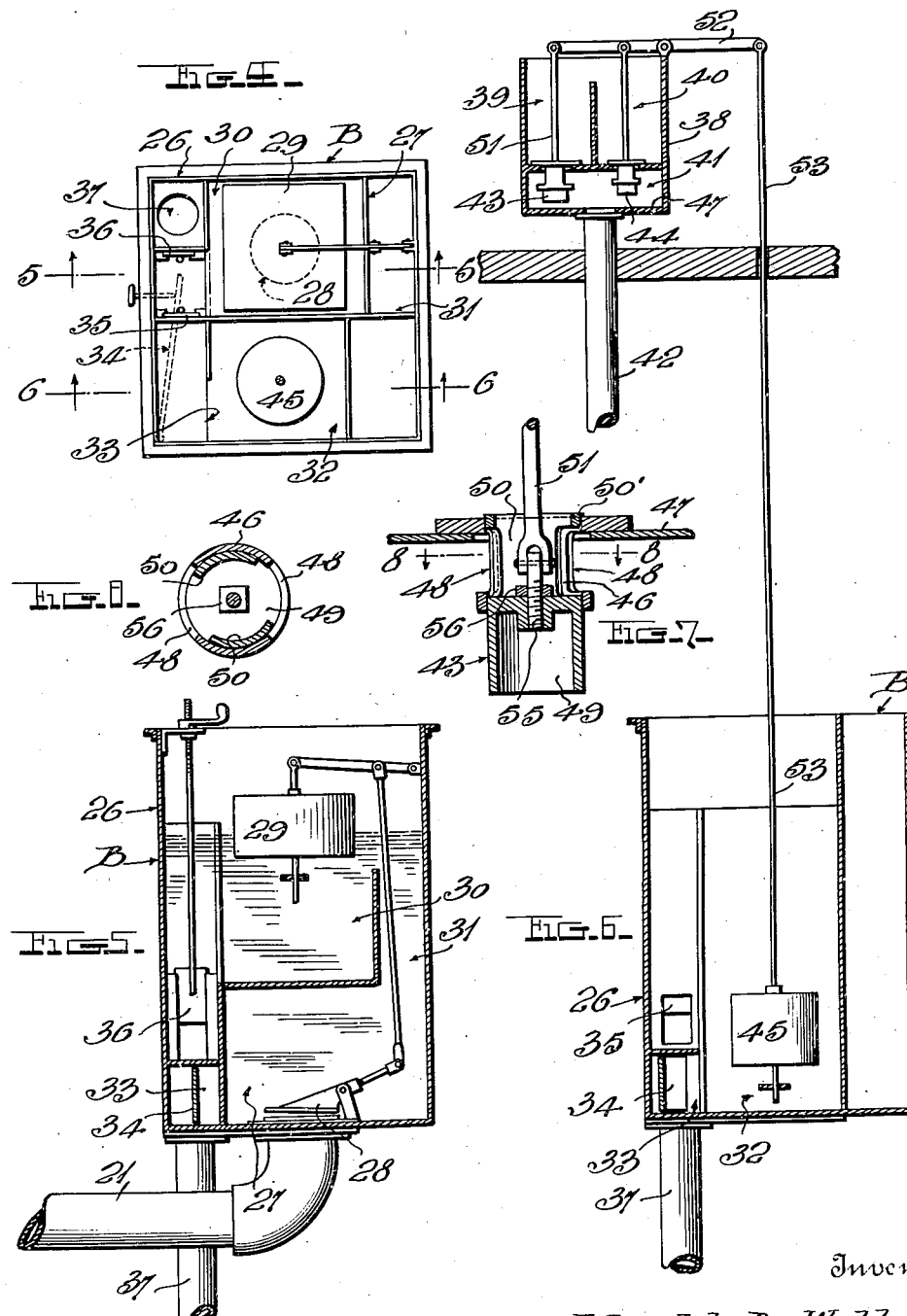

June 15, 1937.   H. D. WELLS   2,083,884
WASTEPAPER DE-INKING AND DE-FIBERING PROCESS AND APPARATUS
Filed Sept. 24, 1932   5 Sheets-Sheet 4

Inventor
Harold D. Wells

Witnesses
H. Woodard

By H. B. Willson & Co.
Attorneys.

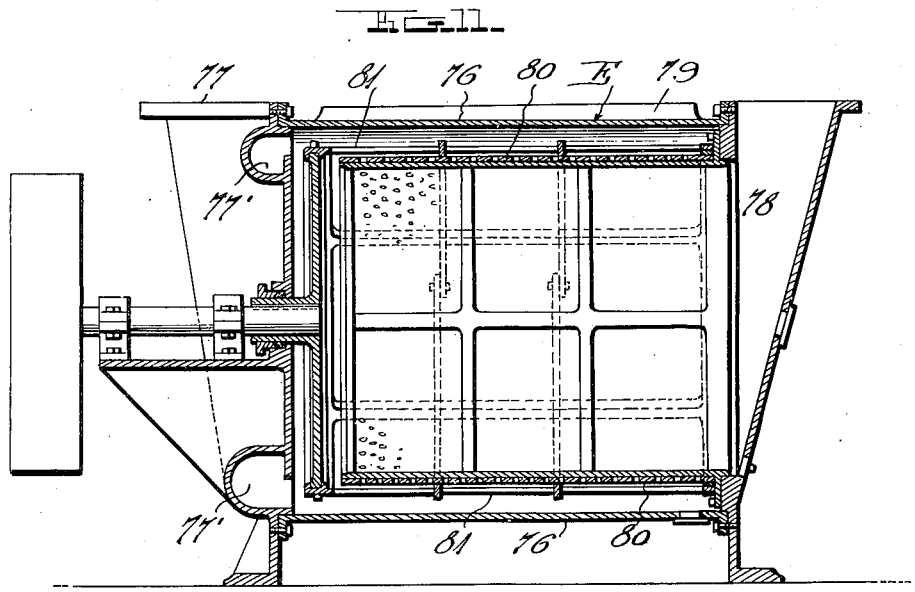
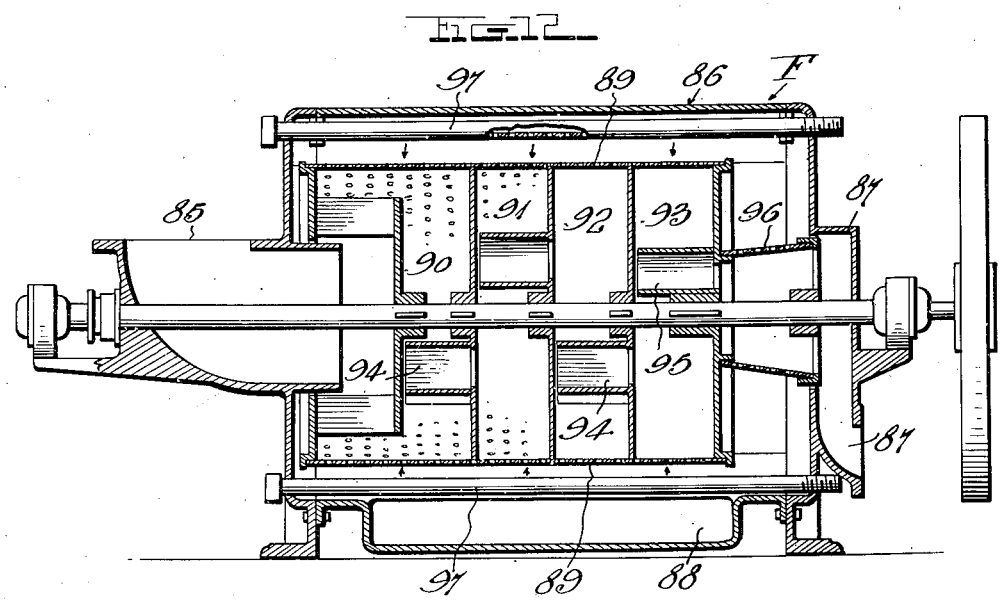

Patented June 15, 1937

2,083,884

UNITED STATES PATENT OFFICE 2,083,884

WASTEPAPER DE-INKING AND DE-FIBERING PROCESS AND APPARATUS

Harold Donald Wells, Glens Falls, N. Y.

Application September 24, 1932, Serial No. 634,748

26 Claims. (Cl. 92—20)

The invention aims primarily to provide a novel and advantageous process and apparatus for continuously and inexpensively converting waste print papers into pulp to be re-used in paper manufacture.

Further objects are to provide a process and apparatus with which ordinary detergents such as caustic soda, soaps and the like, may be effectively used; to provide for continuous de-fibering and de-inking of old papers; to provide for de-fibering and classifying the pulp at the beginning of the process to effect better results; to provide for the proper proportioning of detergents and water and to provide effectively for consistency regulation to maintain proper proportions of pulp, water and detergent; to provide for hydrating the pulp to fibers; to provide for the recovery of a considerable percentage of the detergent; to provide for centrifugal separation of dirt and ink particles from the pulp; to provide for effective de-fibering and de-inking without the use of steam or any kind of heat; to provide a process and apparatus in which foam troubles are eliminated; to provide for better removal of ink than with prior processes and apparatus; to provide for the attainment of good results with great saving in time and operating costs; to provide for reduction in fiber losses; to provide for the production of pulp from which all flakes of paper have been eliminated; to provide for the production of whiter pulp; and to provide an apparatus which may operate without detergents if desired.

With the foregoing in view, the invention resides in the novel subject matter hereinafter described and claimed, description being accomplished by reference to the accompanying drawings.

Fig. 1 is a diagram of one form of apparatus for carrying out the process.

Fig. 2 is a diagrammatic top plan view of the apparatus shown in Fig. 1.

Fig. 3 is an enlarged sectional view through the de-fiberer and de-inker in which the waste papers are pulped.

Fig. 4 is a top plan view of the consistency regulator, the valves above the body of the regulator however, being omitted.

Figs. 5 and 6 are vertical sectional views on lines 5—5 and 6—6 of Fig. 4.

Fig. 7 is an enlarged vertical sectional view through one of the valves of the regulator.

Fig. 8 is a horizontal sectional view on line 8—8 of Fig. 7.

Figure 9:
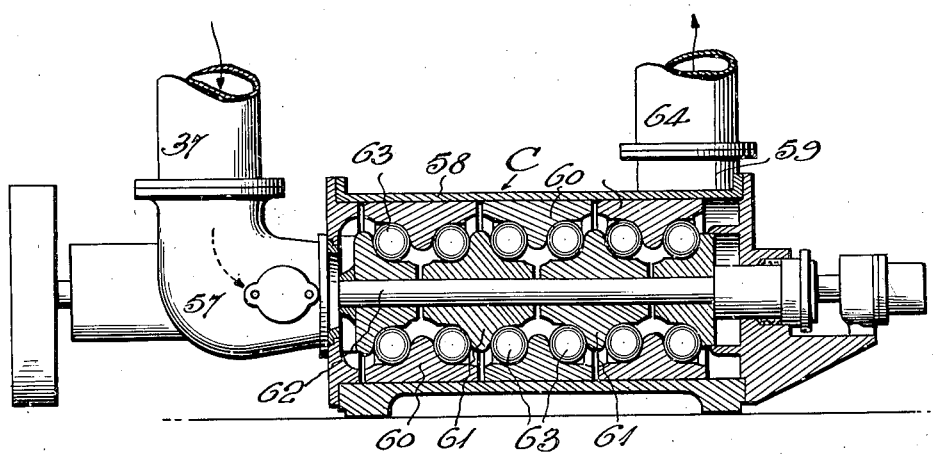

Fig. 9 is a vertical sectional view through the hydrator.

Figure 10:
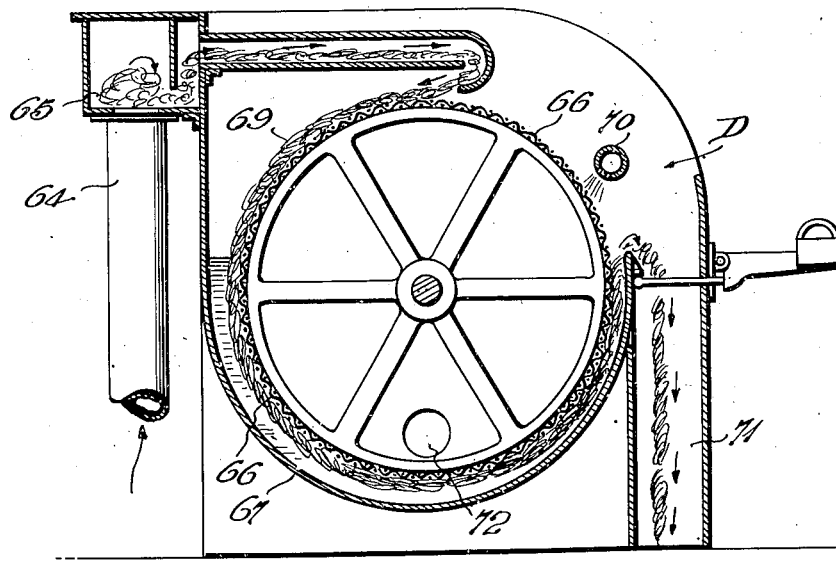

Fig. 10 is a vertical sectional view through the filter.

Fig. 11 is a vertical sectional view through the pulp screen and centrifugal separator.

Fig. 12 is a vertical sectional view through one of the pulp and dirt separators.

In the preferred way of carrying out the process, the whole waste papers are continuously fed into, and submerged and pulped in a cold tank-contained detergent solution to form a thin fluid (preferably containing from three to five percent pulp). This fluid is continuously circulated past a screened outlet of the tank to continuously select all properly pulped fibers and to continuously discharge them with a quantity of the detergent fluid in which they are suspended, all large flakes and the like rejected by the screen being retained in the tank for further pulping. As needed, detergent solution is added to the tank contents to maintain the consistency of the continuously discharging stream (preferably at from three to five percent pulp). The suspended pulp in the flowing stream is continuously de-fibered and the dirt and ink in said stream are continuously reduced to fine particles, and these steps are preferably carried out by rolling the pulp with pressure to hydrate the fibers while de-fibering and reducing dirt and ink to fine particles. Part of the detergent solution is now preferably filtered from the flowing stream and returned to the tank for further use, but if desired, this filtration step and return of detergent solution may be dispensed with. The flowing stream is continuously screened and washed to separate particles of ink and dirt, and detergent from the pulp, and the stream may then flow to storage so that the pulp may be re-used for manufacture into paper.

When part of the detergent solution is filtered from the flowing stream as above explained, the stream of course becomes thickened (usually to from ten to fifteen percent fiber content) and water may then be added to bring it to screening consistency (preferably containing approximately one-half percent fiber). After one screening, washing and separating operation, other similar operations, which also preferably thicken the stream, may be performed.

A preferred apparatus has been illustrated and will be described. This apparatus embodies a de-fiberer and de-inker A, a consistency regulator B, a hydrator C, a filter D, a screen E and a number of pulp and dirt separators F, all connected to continuously conduct the stream discharged from the de-fiberer and de-inker A, and to perform the above described steps.

The de-fiberer and de-inker A is of the type disclosed in my U. S. Patent 1,951,684 of March 20, 1934; the consistency regulator B is analogous to but changed over that shown in my U. S. Patent 1,890,799 of December 13, 1932; the hydrator C is of the form shown in my U. S. Patent 1,897,157 of February 14, 1933; the filter D is of known construction; the screen E is of the form shown in my U. S Patent 1,834,298 of December 1, 1931; and the pulp and dirt separators F are as shown in my U. S. Patent 1,897,156 of February 14, 1933; but sufficient disclosure will be herein given to make this application dependent only upon itself and to disclose any patentable novelty which may exist in the combination of the various elements and/or in changes made to successfully connect them in co-operative combination.

The de-fiberer and de-inker A includes a tank 15 for a cold detergent solution 16, said tank having a feed hole 17 into which the waste papers are dumped without the necessity of first shredding or otherwise reducing them to small fragments. The lower end of the tank is provided with discharge means 18 for discharge of any foreign matter which will not become pulped. Within the tank 15 is a screen 19 surrounded by a jacket 20 from which a discharge pipe 21 extends, and passing through said screen is a shaft 22 carrying a screw 23 and a beater 24. The screw 23 creates rapid circulation in the tank 15, and the beater 24 acts upon the papers in the circulated detergent solution, so that the soaked papers are rapidly de-fibered by a frictional brushing and rubbing action and de-inked to a large extent during the first step of the process and a thin fluid is formed of the solution and fibers. This fluid is circulated past the screen 19 and any of said fluid carrying properly de-fibered pulp, discharges in a continuous stream through said screen, the jacket 20 and the pipe 21. All paper fragments rejected by the screen 19 remain in the tank 15 and are further soaked, circulated and beaten until properly de-fibered. As the stream discharges through the pipe 21, more detergent solution is supplied as needed to the tank 15 through a pipe 25 to maintain the outgoing fluid at proper consistency. Such supply of detergent is effected automatically in accordance with requirements, due to the construction and action of the regulator B and its association with the de-fiberer and de-inker A, as will now be described.

The regulator B includes a casing 26 having an initial receiving chamber 27 to which the discharge pipe 21 of the de-fiberer and de-inker A extends, the inlet of said chamber being controlled by an admission valve 28 having an operating float 29. This float is within a second chamber 30 superposed with respect to the chamber 27 and communicating with the latter through a passage 31. At one side of the chambers 27 and 30 is a control chamber 32 having a discharge passage 33 equipped with an adjustable gate 34, said control chamber being in communication with the chamber 30 through an adjustable gate 35. Another adjustable gate 36 places the chamber 30 in direct communication with the discharge passage 33 and a discharge pipe 37 leads from this passage 33.

Above the casing 26 is a tank 38 divided into a detergent chamber 39, a water chamber 40 and a subjacent detergent and water mixing chamber 41, the latter having an outlet pipe 42 which is coupled to the pipe 25 of the de-fiberer and de-inker A. Constant levels of detergent and water are maintained in the chambers 39 and 40 respectively by means of any desired means such as supply pipes 39' and 40' and float valves (not shown), and said chambers 39 and 40 are in valved communication with the chamber 41 by means of valves 43 and 44 respectively. Both of these valves are operatively connected with and actuated by a float 45 in the control chamber 32, and rise and fall of the fluid level in this chamber under variances in the consistency of the fluid stream passing through the regulator B from the de-fiberer and de-inker A, operate said float to either increase or decrease the supply of water and detergent to said de-fiberer and de-inker, thereby maintaining the flowing stream at substantially uniform consistency.

The entrance of the stream of pulp and detergent solution to the regulator is controlled by the float-actuated valve 28 so that the regulator will neither be over-fed nor under-fed and a constant head will be maintained above the gates 35 and 36. The fluid constantly flows through these gates and flows from the chamber 32 through the discharge passage 33 and on to the discharge pipe 37. If the fluid be at proper consistency, the level in chamber 32 will not vary, but if the fluid be too thin, the level will lower, and if said fluid be too thick, said level will rise. Such fluctuations move the float 45 and this float operates the valves 43 and 44 to change the feeding of detergent solution to the tank 15 as may be required, to immediately restore the fluid stream to the proper consistency.

Each of the valves 43 and 44 is preferably adjustable so that the detergent and water may be mixed in any desired proportions, and the construction of the valve 43 is illustrated in Figs. 7 and 8, the valve 44 being a duplicate. A sleeve 46 is secured at its upper end to the bottom 47 of the chamber 39, said sleeve having open ends and two liquid ports 48 between its ends. A piston 49 is slidable in the sleeve 46 and is adapted when raised to close said ports. This piston is provided with upstanding arms 50 lying against the sleeve and adapted to partially overlap the widths of the ports 48 when these ports are opened by the piston 49, said arms being connected at their upper ends by a ring 50'. The valve is shown in open position (piston 49 lowered) with the piston arms 50 overlapping part of the width of the ports 48 but the piston 49 may be turned on its carrying stem 51 so that when said piston is lowered, more or less of the width of said ports 48 will be opened to permit liquid flow therethrough. Thus, the valve may be readily adjusted to pass the required amount of liquid. As the piston 49 is raised, it gradually closes the ports 48.

In the preferred construction, the stems 51 of the two valves are pivoted to a single lever 52 connected by a rod 53 with the float 45. This necessitates formation of each stem 51 in two sections hinged together in order to allow arcuate movement of the upper ends of the stems with the lever, during straight movement of the pistons 49 within the sleeves 46. These pistons are preferably threaded at 55 upon the lower stem sections to allow the above described turning adjustment of said pistons, and lock nuts 56 may be used to hold said pistons adjusted.

The discharge pipe 37 of the regulator B extends to the inlet 57 of the hydrator C. This hydrator comprises a casing 58 having a lateral outlet 59, a plurality of fixed race members 60 in said casing, a plurality of rotary race members 61 carried by a driven shaft 62, and balls or other rollers 63 between said race members 60 and 61. The stream of detergent solution and fibers, flows through the casing 58 and said fibers are subjected to a myriad of pressure-rolling operations between the rollers 63 and the co-acting race members to de-fiber any existing small flakes or the like, to reduce all dirt and ink to fine particles, to thoroughly cleanse the fibers, and to hydrate said fibers for producing stronger paper.

From the hydrator outlet 59, a pipe 64 leads to the inlet 65 of the filter D. This filter includes a rotary driven screen 66 slightly eccentric to a smooth concave 67, and means 68 for depositing a mat 69 of the ingoing pulp upon the periphery of said screen. This mat is pressed between the screen and the concave and a large percentage of the detergent solution is thus forced to enter the interior of said screen, while the fibers and remaining solution are washed by a shower pipe 70 into a pulp outlet 71. The detergent solution received within the screen 66 may be returned to the tank 15 through a pipe 72 for further use.

From the pipe 64, a valved pipe 64' extends back to the supply pipe 21 leading into the regulator B. This pipe 64' is for regulating purposes, and permits a small portion of the pulp discharging from the hydrator to be continuously returned to the inlet of the regulator. The purpose of this is to make the regulator automatic, and eliminate hand operation when the flow from de-inker to regulator slackens below the requirements of the regulator.

From the pulp outlet 71 of the filter D, the fluid stream quite thickened, flows through a pipe 73 into the head box 74 of the screen E where it is brought to screening consistency by adding water, a pipe 75 being shown for this purpose.

The screen E is of a centrifugal separator and inward flow type and includes a casing 76 having a pulp inlet 77—77' at one end, a screened-pulp outlet 78 at its other end and a tailings outlet 79 at its upper portion. A cylindrical screen 80 guards the outlet 78, and a driven agitator frame 81 surrounds said screen and is constructed to centrifugally throw and radially pulsate the pulp-laden fluid surrounding the screen. The tailings may be carried back from the outlet 79 to the tank 15 for further pulping and for this purpose, I have shown a pipe 82 and a pump 83.

The screen E classifies the fibers, and separates and removes much of the heavier particles of dirt and ink by centrifugal force. From the outlet 78 of this screen, the fluid flows through a flume or the like 84 to the inlets 85 of the pulp and dirt separators F where the remaining detergent and minute particles of ink and dirt, are washed out and removed by centrifugal force and the pulp thickened for paper manufacture.

Each pulp and dirt separator E includes a casing 86 having the pulp inlet 85 at one end, a clean pulp outlet 87 at its other end, and a waste outlet 88 at its bottom. Within the casing 86 is a driven rotary screen 89 whose interior is partitioned into a plurality of chambers 90, 91, 92, and 93. The pulp enters the chamber 90 and is gradually fed into the succeeding chambers by scoops 94 and from the last chamber 93, the pulp is fed by another scoop 95 into a small screen 96 which extends to the outlet 87. At suitable locations, are shower pipes 97 which inwardly spray water upon the screen 89.

During its travel through the pulp and dirt separator F, the pulp is thoroughly cleaned and washed, and fine particles of dirt and ink and remaining detergent pass through the screens 89 and 93 and discharge through the outlet 88 to a drain 98. The cleaned pulp, thickened by removal of some of the liquid, discharges from the outlet 87 into piping 99 and then passes to storage.

From the foregoing and the accompanying drawings, it will be seen that I have provided a novel and advantageous process and apparatus for continuously and inexpensively de-fibering and de-inking waste papers, without the use of heat and without the necessity of pre-shredding or otherwise reducing the papers to small fragments.

While the preferred process steps and apparatus have been disclosed, variations may of course be made within the scope of the subjoined claims.

I claim:—

1. A process of de-fibering and de-inking waste papers, comprising the steps of submerging and pulping the papers in a detergent solution to continuously form a thin fluid, continuously discharging a stream of this fluid from the solution container and screening it before discharge to leave all screen rejections in said container for further pulping, adding detergent solution to said container as needed to maintain the consistency of the discharging stream of fluid, continuously subjecting the pulp in the flowing stream to a myriad of pressure-rolling operations to hydrate and de-fiber the same and reduce dirt and ink in the stream to fine particles, and continuously removing dirt and ink particles and detergent from the flowing stream.

2. A process of de-fibering and de-inking waste papers, comprising the steps of submerging and pulping the papers in a detergent solution to continuously form a thin fluid, continuously discharging a stream of this fluid from the solution container and screening it before discharge to leave all screen rejections in said container for further pulping, adding detergent solution to said container as needed to maintain the consistency of the discharging stream of fluid, continuously defibering the pulp in the flowing stream and reducing dirt and ink therein to fine particles, continuously filtering part of the detergent solution from the stream and continuously returning such solution to the above mentioned solution container, and continuously removing dirt and ink particles and the remainder of the detergent from the flowing stream.

3. An apparatus of the class described comprising a tank for a detergent solution, said tank having an inlet through which waste papers are fed, means in said tank for pulping the papers to form a thin fluid of the pulp and detergent solution, an outlet from said tank having a selector screen for passing only fluid containing properly pulped fibers, means for adding detergent solution to said tank as needed to maintain the consistency of the outgoing fluid stream, means for subjecting the pulp in said outgoing stream to a myriad of pressure-rolling operations for further de-fibering the pulp, for reducing foreign matter to fine particles, and for impregnating the pulp with the detergent solution, and means for then removing foreign matter and detergent from said stream.

4. An apparatus of the class described comprising a tank for a detergent solution, said tank having an inlet through which waste papers are fed, means in said tank for pulping the papers to form a thin fluid of the pulp and detergent solution, an outlet from said tank having a selector screen for passing only fluid containing properly pulped fibers, means for adding detergent solution to said tank as needed to maintain the consistency of the outgoing fluid stream, means for rolling the pulp in said outgoing stream to reduce foreign matter to fine particles and to impregnate the pulp with the detergent solution, and means for removing the foreign matter and detergent from said stream.

5. An apparatus of the class described comprising a detergent liquid-containing tank into which waste papers are fed, means in said tank for pulping the papers to form a fluid of the pulp and liquid, a fluid outlet from the tank having a selector screen for passing only fluid containing properly pulped fibers, means for adding liquid to said tank as needed to maintain the consistency of the outgoing fluid stream, means for pressing some of the detergent solution from the pulp in said stream, means for continuously returning the pressed-out solution to said tank, and means for removing foreign matter from the stream.

6. In an apparatus of the class described, a tank for a paper-treating liquid, said tank having an inlet into which waste papers are fed, means in said tank for pulping the papers to form a fluid of the pulp and liquid, an outlet from said tank for discharging a continuous stream of said fluid, liquid supply means including a valve for supplying liquid to said tank, a control chamber through which the tank-discharged fluid stream flows, a member in said control chamber movable under consistency variances in said stream, and operating connections between said movable member and said valve for operating the latter to control the supply of liquid to said tank in accordance with consistency requirements.

7. An apparatus for de-inking waste paper comprising pulping mechanism in which the papers are pulped in detergent solution, means for automatically controlling the consistency of the pulp and the concentration of detergent, means for impregnating the pulp with detergent and further de-fibering the pulp, washing mechanism for removing detergent and ink from the pulp, and connections between the pulping and washing mechanisms for causing a continuous flow of pulp.

8. An apparatus for de-inking waste paper comprising pulping mechanism in which the papers are pulped in detergent solution, means for automatically controlling the consistency of the pulp and the concentration of detergent, washing mechanism for removing detergent and ink from the pulp, and means for conducting the pulp from said pulping mechanism to said washing mechanism.

9. An apparatus for de-inking waste paper comprising pulping mechanism in which the papers are pulped in detergent solution, means for automatically controlling the consistency of the pulp in said pulping mechanism, washing mechanism for removing detergent and ink from the pulp, and means for conducting the pulp from said pulping mechanism to said washing mechanism.

10. An apparatus for de-inking waste paper comprising pulping mechanism in which the papers are pulped in detergent solution, means for automatically controlling the concentration of detergent in said pulping mechanism, washing mechanism for removing detergent and ink from the pulp, and means for conducting the pulp from said pulping mechanism to said washing mechanism.

11. A process of de-inking and de-fibering waste papers comprising the steps of submerging and pulping the papers in a detergent solution to form a thin fluid, continuously discharging a stream of this fluid from the solution container, controlling automatically the consistency of the fluid pulp in said container, adding detergent solution to said container as needed, and removing ink and detergent from the pulp.

12. A process of de-inking and de-fibering waste papers comprising the steps of submerging and pulping the papers in a detergent solution to form a thin fluid, continuously discharging a stream of this fluid from the solution container, controlling automatically the concentration of detergent in said container, adding water as needed to said container, and removing detergent and ink from the pulp.

13. A process of de-fibering waste papers or pulp comprising the steps of submerging and pulping papers or pulp in a chemical liquid to form a thin fluid, continuously discharging this fluid from the pulping container, controlling automatically the consistency of the fluid pulp and controlling automatically the concentration of chemicals in said container.

14. A process of de-fibering waste papers or pulp comprising the steps of submerging and pulping the papers in a detergent liquid to form a thin fluid, continuously discharging this fluid from the container, controlling automatically the concentration of detergent in said container, and continuously washing detergent and ink from the pulp.

15. An apparatus for de-inking waste paper comprising pulping mechanism in which the papers are pulped in detergent solution, means for conducting the fluid pulp from said pulping mechanism, regulable means for conducting detergent to said pulping mechanism, regulable means for conducting water to said pulping mechanism, and means for automatically regulating said detergent-conducting means and said water-conducting means to control the quantity of detergent and water supplied to said pulping mechanism, in accordance with requirements.

16. A process of de-fibering and de-inking waste papers, comprising the steps of submerging and pulping the papers in a detergent solution to continuously form a thin fluid, continuously discharging a stream of this fluid from the solution container and screening it before discharge to leave all screen rejections in said container for further pulping, automatically adding detergent solution and water to said container as needed to maintain the consistency of the discharging stream of fluid, and continuously removing dirt and ink particles and detergent from the flowing stream.

17. A process of de-fibering and de-inking waste papers, comprising the steps of submerging and pulping the papers in a detergent solution to continuously form a thin fluid, continuously discharging a stream of this fluid from the solution container and screening it before discharge to leave all screen rejections in said container for further pulping, automatically adding detergent solution and water to said container as needed to maintain the consistency of the discharging stream of fluid, continuously de-fibering the pulp in the flowing stream and reducing the ink and dirt therein to fine particles, and continuously removing dirt and ink particles and detergent from the flowing stream.

18. A process of de-fibering and de-inking waste papers, comprising the steps of submerging and pulping the papers in a detergent solution to continuously form a thin fluid, continuously discharging a stream of this fluid from the solution container and screening it before discharge to leave all screen rejections in said container for further pulping, automatically adding detergent solution and water to said container as needed to maintain the consistency of the discharging stream of fluid, continuously de-fibering the pulp in the flowing stream and reducing dirt and ink therein to fine particles, continuously filtering part of the detergent solution from the stream and returning such solution to the above-mentioned solution container, and continuously washing and screening the flowing stream to remove dirt and ink particles and remaining detergent therefrom.

19. An apparatus of the class described comprising a liquid-containing tank into which waste papers are fed, means in said tank for pulping the papers to form a fluid of the pulp and liquid, a fluid outlet from the tank having a selector screen for passing only fluid containing properly pulped fibers, means for automatically adding liquid to said tank as needed to maintain the consistency of the outgoing fluid stream, and means for removing foreign matter from said stream.

20. An apparatus of the class described comprising a tank for a detergent solution, said tank having an inlet through which waste papers are fed, means in said tank for pulping the papers to form a fluid of the pulp and detergent solution, an outlet from said tank having a selector screen for passing only fluid containing properly pulped fibers, means for automatically adding detergent solution and water to said tank as needed to maintain the consistency of the outgoing fluid stream, means for rolling the pulp in said outgoing stream to reduce foreign matter to fine particles and to impregnate the pulp with the detergent solution, and washing and screening means for removing the foreign matter and detergent from said stream.

21. The method of de-inking, de-fibering and reclaiming waste paper and the like and of hydrating the resulting pulp in a continuous manner which comprises breaking up the paper in the presence of water and a small amount of detergent and hydrating chemicals to form a pulp, maintaining a body of such pulp of proper density in rapid circulation at relatively low temperatures, the density of the pulp being regulated to cause an active brushing and rubbing action between the fibers, supplying thereto additional paper, water and chemicals, and continuously breaking up the paper and forming additional pulp therefrom, drawing off pulp in a continuous manner from the circulating body and subjecting it to a refining and hydrating treatment in the presence of the detergent and hydrating chemicals, thereby effecting de-inking, de-fibering and hydrating of the material in the presence of the detergent chemical by a rapid brushing and rubbing treatment, and separating the ink from the pulp by a washing treatment.

22. The method of de-inking, de-fibering and reclaiming waste paper and the like and of hydrating the resulting pulp in a continuous manner which comprises supplying the waste paper without previous shredding, soaking or cooking to a rapidly circulating body of pulp containing detergent and hydrating chemicals, adding water and detergent and hydrating chemicals to said body of pulp and regulating the consistency to maintain a pulp at a low temperature in which an active brushing and rubbing will take place between the fibers, drawing off pulp in a continuous manner from the circulating body and subjecting it to a high speed hydrating and refining treatment while still in the presence of the detergent and hydrating chemicals, and washing the separated ink from the pulp.

23. The method of de-inking, de-fibering and reclaiming waste paper and the like which comprises forming the paper into a pulp in the presence of water and a small amount of detergent and hydrating chemicals, in a continuous manner, subjecting the resulting pulp in a continuous manner to a combined chemical and mechanical brushing action at a low temperature to effect de-inking and de-fibering, drawing off part of the resulting pulp continuously and subjecting it to a combined chemical and mechanical hydrating and refining treatment while still in the presence of detergent and hydrating chemicals, and washing the resulting pulp to remove separated ink therefrom.

24. The method of de-inking, de-fibering and reclaiming waste paper and the like in a continuous manner which comprises feeding the paper together with water and a solution of detergent chemicals in a continuous manner to a body of rapidly circulating pulp and disintegrating the paper by the combined chemical and mechanical action of the chemicals and rapid circulation to form additional pulp therein, subjecting the fibers of the pulp to rapid circulation to effect a swift brushing action to quickly dissolve and/or loosen the ink and de-fiber the stock, screening the pulp and passing the screened pulp continuously through a high speed hydrator to effect further de-inking of the fibers and hydration of the pulp, separating dirt, carbon, etc., from the pulp by a centrifugal treatment and washing the pulp to remove ink, etc., therefrom.

25. The method of de-inking and de-fibering waste paper and the like in a continuous manner which comprises adding the waste paper without previous shredding or soaking, together with water and chemicals in regulated amounts to a body of rapidly circulating pulp made therefrom, regulating the consistency of the pulp to maintain a body of pulp in which the fibers and the pieces of paper are caused to rub and brush each other by frictional engagement and resistance during the rapid circulation, automatically regulating the supply of water and chemicals in proportion to the added waste paper to maintain a body of rapidly circulating pulp in which such rubbing and brushing action takes place, the amount and nature of the chemicals supplied being sufficient, together with the rapid circulation and resulting frictional engagement and rubbing and brushing action, to effect rapid de-inking and de-fibering of the paper, and continuously withdrawing from said rapidly circulating body of pulp a portion thereof while retaining behind in said body the pieces of paper which have not been thoroughly disintegrated and converted into pulp, whereby the de-inking and de-fibering operation takes place continuously with continuous disintegration of the waste paper and continuous rubbing and brushing of the resulting pulp fibers on each other.

26. The method of de-inking and de-fibering waste paper and the like and of hydrating the resulting pulp, which comprises supplying the waste paper, together with water and detergent chemicals in regulated amounts to a rapidly circulating body of pulp and paper, containing a proportion of pulp and paper such that the pieces of paper and the fibers of the pulp engage each other frictionally to cause a brushing and rubbing action, and the proportion of detergent chemicals being a small percentage of the weight of the paper treated, automatically regulating the supply of paper, water and chemicals to maintain the rapidly circulating body of substantially uniform thickness, continuously withdrawing from said circulating body a portion of the pulp and subjecting the same to a refining and hydrating treatment in the presence of the chemicals and subsequently washing the resulting refined and hydrated pulp to remove the chemicals, ink, etc., therefrom.

HAROLD DONALD WELLS.